A. & J. STELL.
DOFFING APPARATUS FOR SPINNING AND LIKE MACHINES.
APPLICATION FILED FEB. 8, 1915.
1,263,714.
Patented Apr. 23, 1918.
6 SHEETS—SHEET 5.
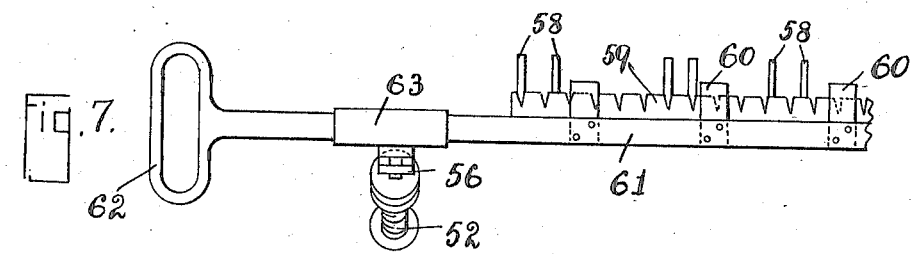
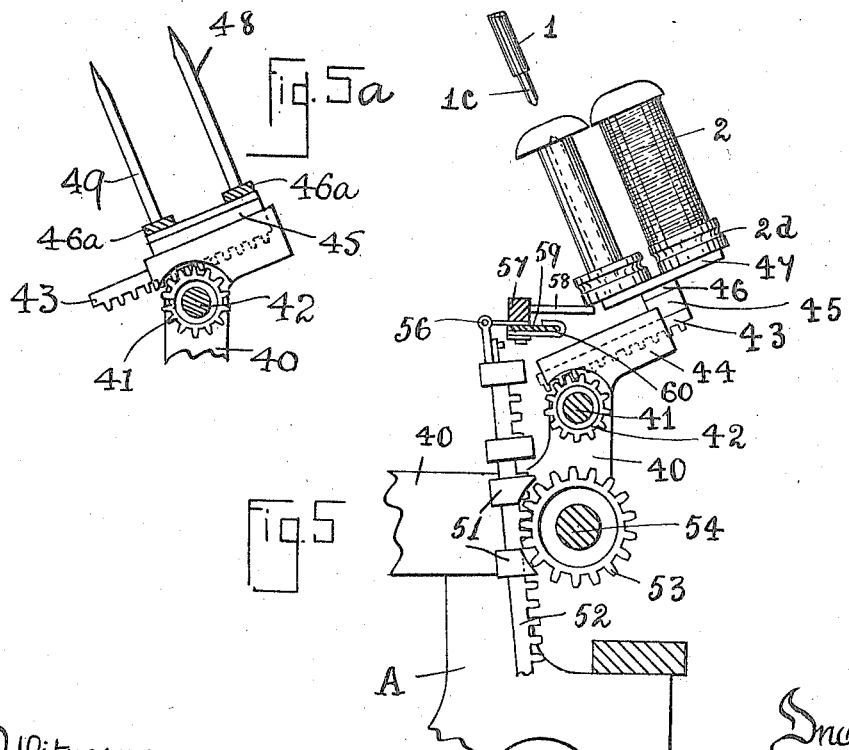

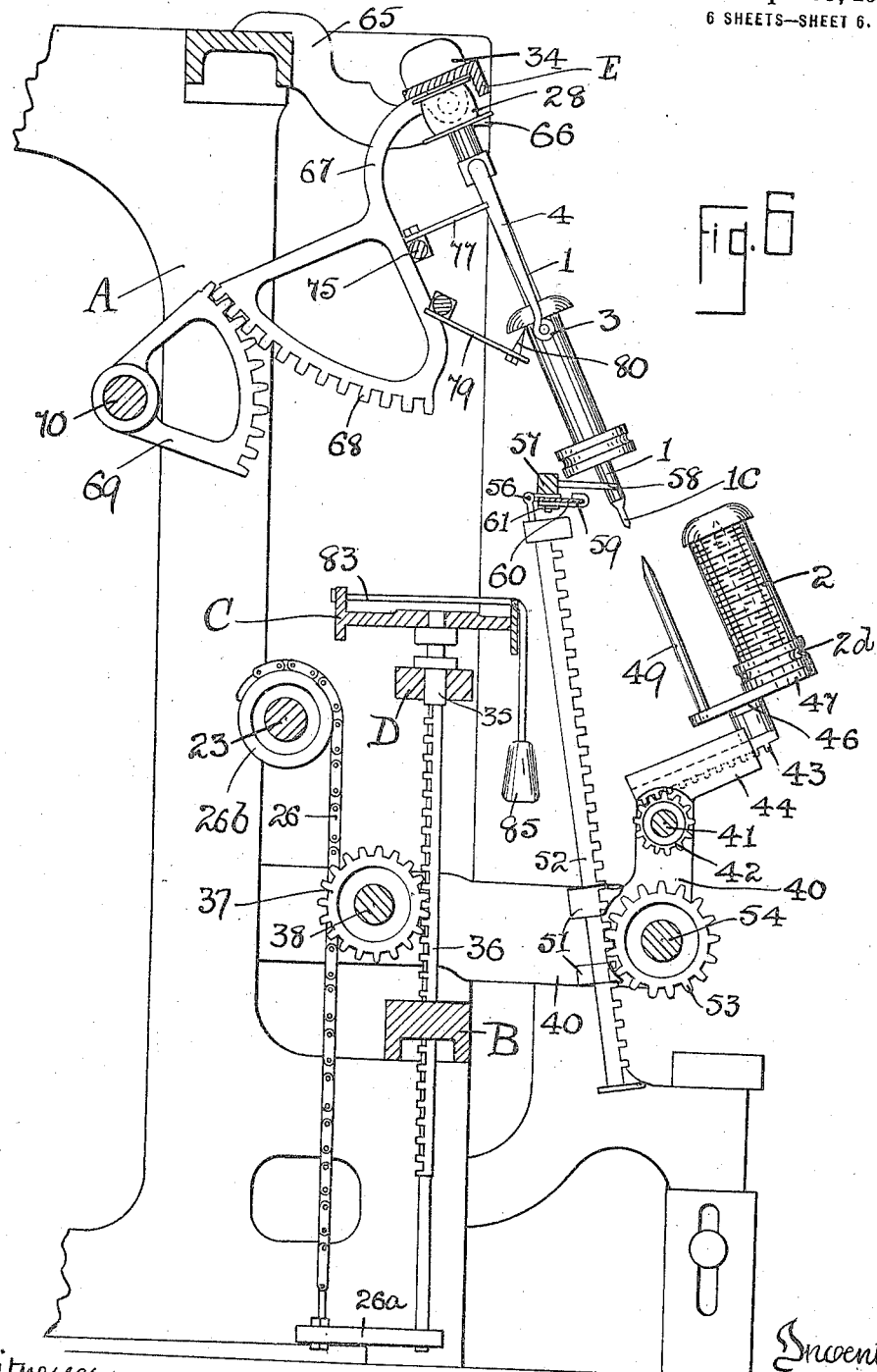

UNITED STATES PATENT OFFICE.

ALFRED STELL, OF STEETON, NEAR KEIGHLEY, AND JOHN STELL, OF KEIGHLEY, YORK, ENGLAND.

DOFFING APPARATUS FOR SPINNING AND LIKE MACHINES.

1,263,714. Specification of Letters Patent. Patented Apr. 23, 1918.

Application filed February 8, 1915. Serial No. 6,785.

*To all whom it may concern:*

Be it known that we, ALFRED STELL and JOHN STELL, subjects of the King of Great Britain, and residents, respectively, of Greenhill, Steeton, near Keighley, in the county of York, England, and 30 Devonshire street, Keighley aforesaid, have invented a certain new and useful Improvement in Doffing Apparatus for Spinning and like Machines, of which the following description, together with the accompanying sheets of drawings, is a specification.

Our invention relates to improvements in doffing apparatus for spinning and like machines of the class known as flier frames. and consists in improvements in the construction and arrangement of certain parts forming said apparatus whereby the functions of doffing are facilitated by the means for moving the spindles and bobbins, the parts carrying same being more easily manipulated than heretofore, while the devices for moving and cutting the threads are mounted in more convenient positions.

In order that our said invention may be readily understood, we have hereunto appended sheets of drawings illustrative thereof, to which, by figures and letters, reference is made in the following description:—

Figure 1 is an end elevation showing the application of our improved devices to a machine for spinning flax, jute or the like.

Fig. 5 is also an end elevation of certain parts shown by Figs. 3 and 4 and illustrates the different parts in the positions they occupy when the full bobbins have been deposited upon the pegs arranged for their reception, the empty bobbins moved into alinement with the spindles, and with parts in position ready for raising said bobbins upon said spindles.

Fig. 5ª is a drawing in detail hereinafter referred to.

Fig. 6 is also a sectional end elevation and shows the empty bobbins raised over the spindles with the dagger pin devices moved into position for supporting them as hereinafter described.

Fig. 7 is a plan of the device for cutting or severing the yarns or threads and for raising the empty bobbins.

Fig. 8 is plan of two spindles and the pegs operating in connection therewith, showing both of said pegs opposite to or in alinement with said spindles.

Figure 1:
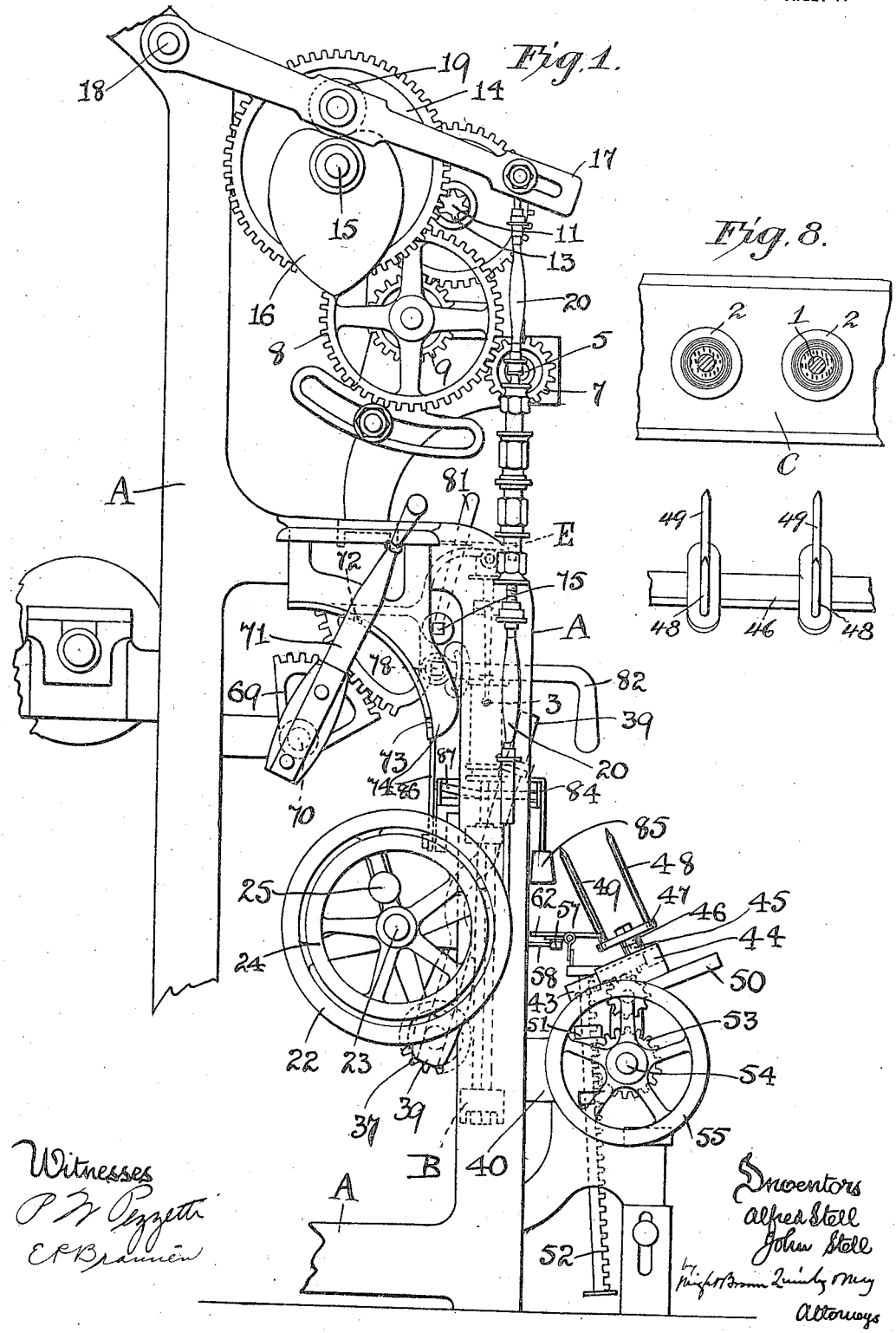
Figure 2:
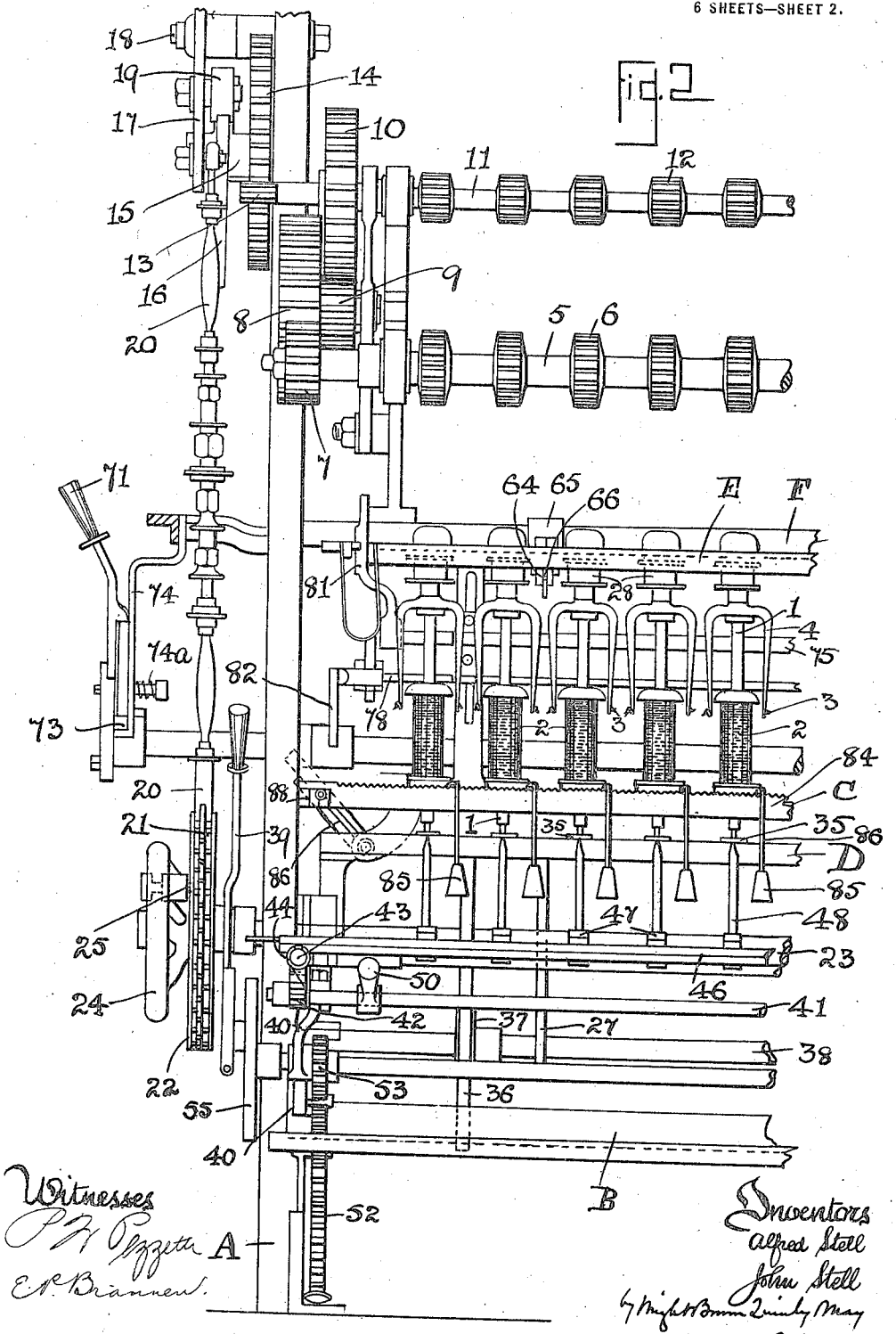
Fig. 2 is a front elevation of said machine.

Figs. 1 and 2 are drawn to a smaller scale than the remainder of the figures.

Similar letters and figures of reference indicate like parts throughout the several views.

The annexed drawings illustrate the application of our improved parts to frames or machines for spinning jute, flax, hemp or the like, but it will readily be understood therefrom and from the following description how our said improvements may be applied to ordinary worsted spinning or other machines.

A indicates the ordinary framework of the machine; B the fixed rail through which pass the rods for raising and lowering the lifter plate C and the racks for raising and lowering the rail D carrying the foot steps for spindles 1, which latter are supported from the oscillating bar E in manner hereinafter described.

Figure 3:
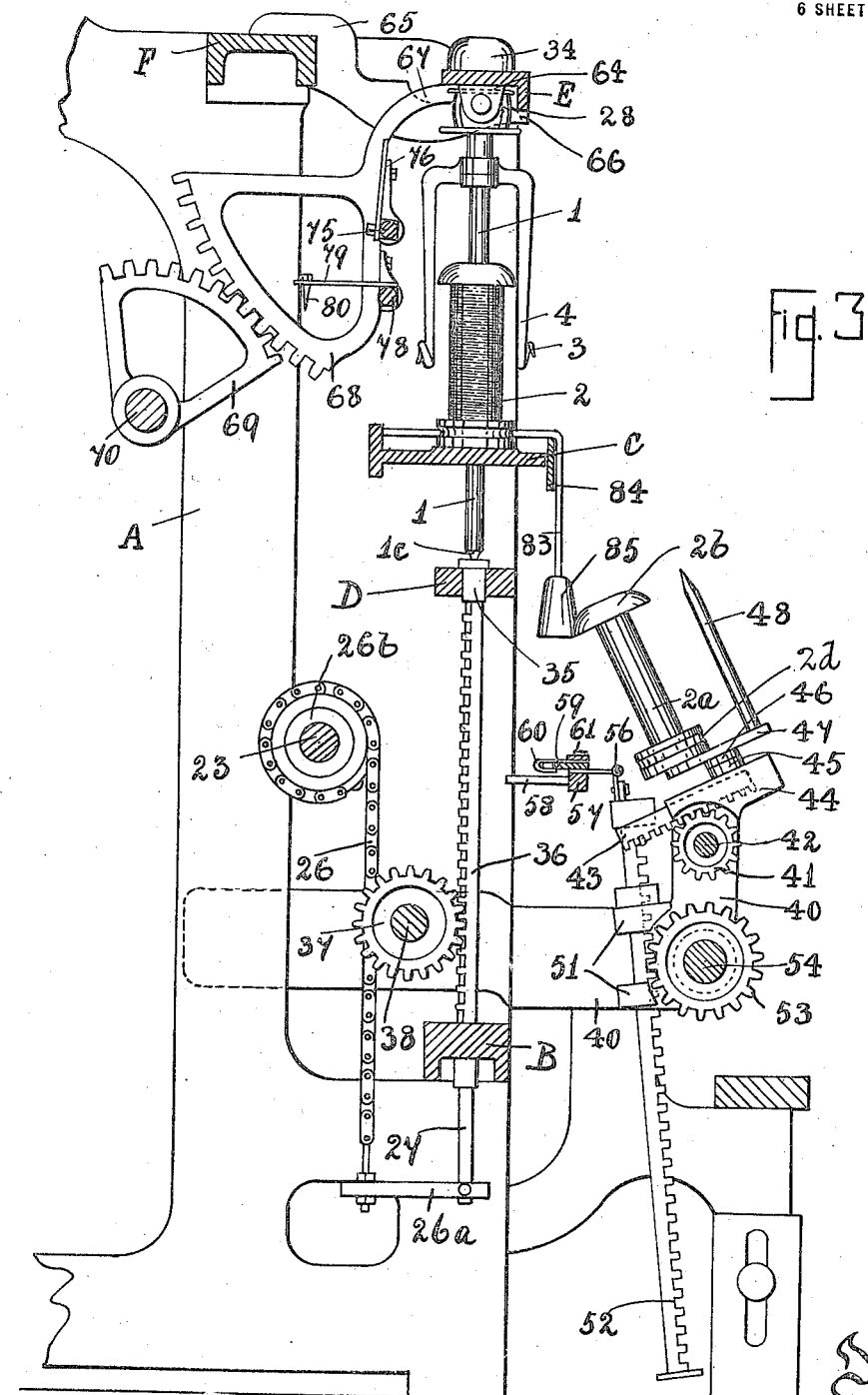
Fig. 3 is a sectional end elevation of a portion of said machine showing the different parts in the positions they occupy during spinning operations.

The lifter plate C supports the bobbins 2 when in the spinning position as indicated by Figs. 1, 2 and 3, and raises and lowers said bobbins 2 within the fliers 4 to regulate the building of the yarns on said bobbins by the guide eyes 3 in manner well understood. The reciprocating of the plate C may be effected in any well known manner but in the machine illustrated it is operated from the shaft 5 of the lower rollers 6 through the pinion 7, gear wheel 8, pinion 9, wheel 10 the shaft 11 of the upper rollers 12, the pinion 13, gear wheel 14 (which is mounted upon the same shaft or stud 15 as the cam 16) which latter operates the lever 17 (fulcrumed at 18 and provided with an antifriction bowl 19) a connecting rod 20 reaching therefrom into connection with a chain 21 which passes around the chain pulley 22 mounted loosely upon the shaft 23, which latter has fixed upon it the hand wheel 24. The pulley 22 and wheel 24 are connected together by the spring-controlled pin 25. Fixed upon the shaft 23 are the chain pulleys 26$^b$ to which are fastened chains 26 connected by the cross pieces 26$^a$ with the rods 27 carrying the lifter plate C. The connection between the chain pulley 22 and the hand wheel 24 enables the building of the yarn on the bobbins to be effected in the ordinary manner automatically from the cam 16, while by disengaging the pin 25 from said chain pulley 22 the shaft 23 may be rotated by hand so as to adjust the lifter plate C as and whenever desired, such as when it is necessary to effect the doffing operations.

The fliers 3 are provided with whorls 28 fixed upon them. The lower ends 1$^c$ of the spindles 1 take within bushings 35 formed in the movable rail D said bushings holding the spindles 1 against lateral movement when the parts are in the spinning position as illustrated by Figs 1, 2 and 3. The bar or rail D is raised and lowered by the racks 36 which are traversed by the pinion 37 fixed upon the shaft 38, this latter being provided with a handle 39 by which it is oscillated as desired.

Figure 4:
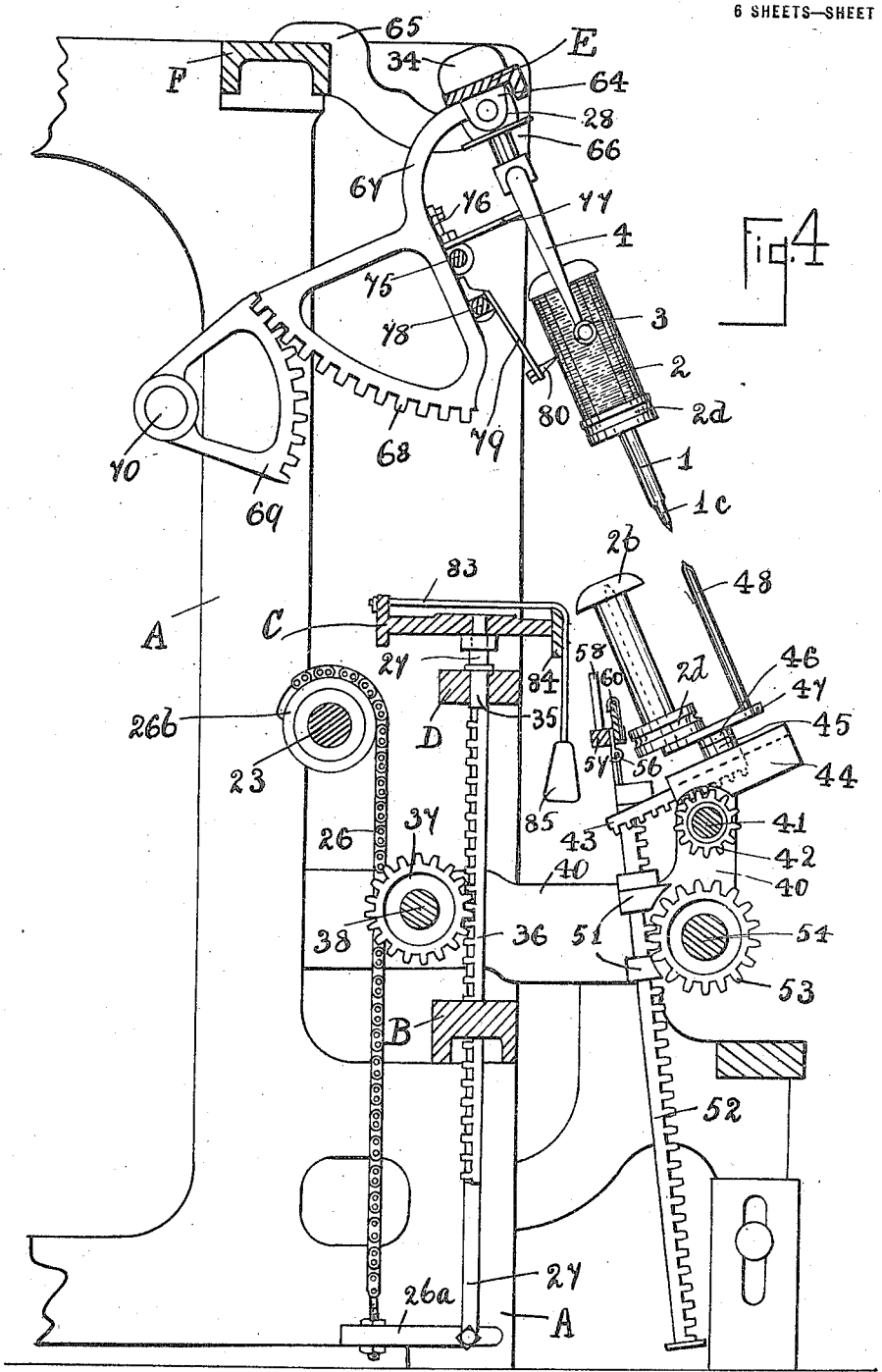
Fig. 4 is a similar view to Fig. 3, but shows the spindles canted ready for the doffing operations to be performed, the bobbins being supported on the spindles by the dagger pin devices hereinafter described.

In appropriately arranged brackets 40 we mount a shaft 41 having fixed upon it a series of pinions 42 these pinions gearing with racks 43 sliding in the bearings 44 supported by the brackets 40. Extensions 45 from the racks 43 carry a plate or rail 46 upon which are mounted plates or cross pieces 47 having fixed upon them pegs 48, 49. Or instead of the cross pieces 47 we may mount the pegs 48, 49 upon two plates or bars 46$^a$ fixed upon the racks 43 or upon extensions thereof (see Fig. 5$^a$) such bars extending the length of the frame. The pegs 48, 49 are arranged in alinement with or opposite to the spindles 1, and are capable of occupying different positions such as that wherein the pegs 48 are in alinement with said spindles 1 when same are in their canted or inclined positions as shown by Fig. 4, or that wherein the pegs 49 are in alinement with said spindles as shown by Figs. 5 and 6. The pegs 48 are for receiving the full bobbins 2, while those 49 are for receiving the empty bobbins 2$^a$ as shown by said Fig. 5, the movement toward and from the framework of the machine to cause the pegs 48 and 49 to assume the positions desired being effected by rotating the pinions 42 by means of the handle 50 fixed upon the shaft 41.

Arranged to slide in bearings 51 are racks 52, the said bearings being so arranged upon the brackets 40 that as said racks are raised by their pinions 53 the upper ends thereof advance toward the framework A. The pinions 53 are fixed upon the shaft 54 which is rotated by the hand wheel 55. At the upper ends of the racks 52 we hinge at 56 a bar 57 upon which is fixed a series of pegs or bifurcated pieces 58 these being for the purpose of moving the threads from the spindles 1 when the full bobbins 2 have been deposited upon the pegs 48. Attached to the bar 57 is a notched plate 59 around which takes a series of plates 60 attached to a bar 61, provided with a handle 62 and sliding within bearings 63 carried by certain of the racks 52. The bar 57 and all the parts carried upon the hinge 56 are capable of being turned or swiveled through any appropriate angle such as an angle of ninety degrees or through a semicircle, in order that they may be moved into the position shown by Fig. 4 or by Fig. 3, or into the position illustrated by Figs. 5 and 6, where the pegs 58 are shown as in the desired position for supporting the empty bobbins 2$^a$.

The bar E is carried by hinged bearings 64 which are supported by the brackets 65 fixed upon the cross bar F of the machine, the outer ends 66 of said brackets forming a support for the lower end of the bar E when the parts are in the spinning position shown by Fig. 3. Fixed beneath the bar E are arms 67 or quadrants 68 these latter gearing with other quadrants 69 fixed upon the shaft 70 which is operated by the handle 71. This handle 71 is pressed or drawn into notches 72, 73 formed on a bracket 74 by the spring 74$^a$, these notches being so arranged that when said handle 71 rests within the notch 72 the spindles 1 are in their vertical positions as required during the spinning operations, or when in the notch 73 said spindles occupy their canted positions as during doffing operations.

A shaft or rod 75 is carried in brackets 76 by the quadrant 68 said shaft having fixed upon it arms or fingers 77 which act as steadiers for the spindles 1 during doffing operations. Another bar or shaft 78 is carried by said quadrant 68 and has arms 79 fixed upon it, these arms being provided with pins 80 which are for the purpose of entering the yarn on the full bobbins 2 as shown by Fig. 4, or of taking below the upper flanges 2$^b$ of the empty bobbins 2$^a$, as illustrated by Fig. 6. These steadying fingers and dagger pins are both of them well known for the purposes which we employ them.

The doffing operations as performed by our said improved parts are as follows:—

Assuming that the bobbins 2 have received the desired quantity of yarn and that it is desired to remove them from the spindles 1 and substitute for them empty bobbins 2ª, the motions of the machine are arrested and the arms of the fliers 4 are moved into alinement with each other in the manner and for the purpose well known. The steadying fingers or arms 77 are then moved by the handle 81 so as to press against the spindles 1 and the dagger pins 80 are moved by the arms 79 (which are operated by the handle 82) so as to enter the yarns on the full bobbins 2. The rail D carrying the footsteps 35 for the spindles 1, and the lifter plate C are then lowered to positions where they are both clear of the lower ends 1ᶜ of the spindles 1. The said spindles 1 are then moved by the handle 71 into the position indicated by Figs. 4, 5 and 6, where they are in alinement with the pegs 48 when same are in the position indicated by Fig. 3, on which the dagger pins 81 are moved away to release the full bobbins 2 which fall on to the pegs 48 beneath.

The rail 46 is then moved by the handle 50 to carry the pegs 48 away from the framework of the machine and the pegs 49 into alinement with the spindles 1. The bar 57 is then raised by the racks 52 and their operating parts into a position in proximity to the spindles 1 so that they may remove the threads from said spindles in manner well known, the bar 57 being oscillated for this purpose upon the hinged bar 56 by means of the handle 62, after which the said bar 57 is lowered and the fingers 58 turned into position so as to be passed beneath the flanges 2ᵈ of the empty bobbins 2ª, these being then raised by said racks 52 and fingers 58 over or along the spindles 1 to a position where the dagger pins or holders 80 may be passed beneath the flanges 2ᵇ on said bobbins as shown by Fig. 6. The quadrants 68, 69, are then operated by the handle 71 to carry the spindles 1 back into their vertical positions as shown by Fig. 3, the lifter rail C and the rail D being then raised into their normal positions over said spindles 1. The bobbins are then allowed to fall on to the lifter plate C by withdrawing the dagger pins 80 and steadying pins 77.

The bar 57 carrying the thread cutting device is then raised so as to catch the threads extending from the full bobbins 2 to the empty bobbins 2ª. A few turns are then given to the bobbins after which the threads are severed in manner well known. The several parts are then returned to their normal positions when the spinning operations may be re-commenced.

From the foregoing description it will be seen that by the employment of a peg rail which is movable toward and from the spindles as hereinbefore described, very little useful space in front of the spindles is occupied during spinning operations, the mounting and operating of the racks carrying the thread cutting and moving devices also being conveniently arranged for this purpose, while the spindles 1 are only required to occupy two positions, one in the vertical spinning position and the other canted so as to be in alinement with the pegs 48 or the pegs 49 as hereinbefore described.

Such being the nature and object of our invention, what we claim is:—

1. In a spinning or like machine, a series of spindles supported at their upper ends, means for canting said spindles, a series of bobbin receivers simultaneously movable into position to receive filled bobbins from said spindles, a series of bobbin carriers simultaneously movable into position to supply empty bobbins to said spindles, means for moving said bobbin carriers and said bobbin receivers simultaneously and respectively into and out of positions in alinement with the canted spindles, and means for moving the empty bobbins simultaneously from said bobbin carriers on to said spindles.

2. In spinning and like machines, a series of pendent spindles and fliers, bobbins operating in connection therewith, means for traversing said bobbins, supports for the lower ends of the spindles, a rail containing said supports, means for raising and lowering said rail, means for canting said spindles and fliers, two series of pegs, one peg in each series being opposite to the respective spindle, supports for said pegs, and means for moving said pegs of either series into approximate axial alinement with the canted spindles.

3. In spinning and like machines, a series of spindles and fliers, means for supporting the spindles and fliers at their upper ends, means for supporting the spindles at their lower ends, means for raising and lowering said supports for the lower ends of said spindles, two series of pegs disposed at an angle to the vertical, supports for said pegs, means for canting said spindles, means for moving either of the series of pegs into approximate axial alinement with the canted spindles, and means for raising the empty bobbins from said pegs on to or over said spindles.

4. In spinning and like machines, a series of spindles and fliers, means for supporting the spindles and fliers at their upper ends, means for supporting the spindles at their lower ends, means for raising and lowering the supports for the lower ends of said spindles, means for moving said spindles into an angular or canted position, means for steadying said spindles during doffing operations, means for temporarily supporting the full bobbins on said spindles during doffing operations, two series of movable pegs movable respectively for receiving full bobbins from the spindles and for holding empty bobbins to be supplied to the spindles, means for moving either series of said pegs into approximate axial alinement with the canted spindles, means for moving the empty bobbins from their pegs on to the spindles, and thread-severing means.

In testimony whereof we have signed our names to this specification in the presence of two subscribing witnesses.

ALFRED STELL.
JOHN STELL.

Witnesses:
JOHN WHITEHEAD,
ED. B. NICHOLLS.

Copies of this patent may be obtained for five cents each, by addressing the "Commissioner of Patents, Washington, D. C."